May 22, 1962 G. M. BEATTY 3,035,613
PULSATION DAMPENER
Filed Aug. 8, 1958 2 Sheets-Sheet 2
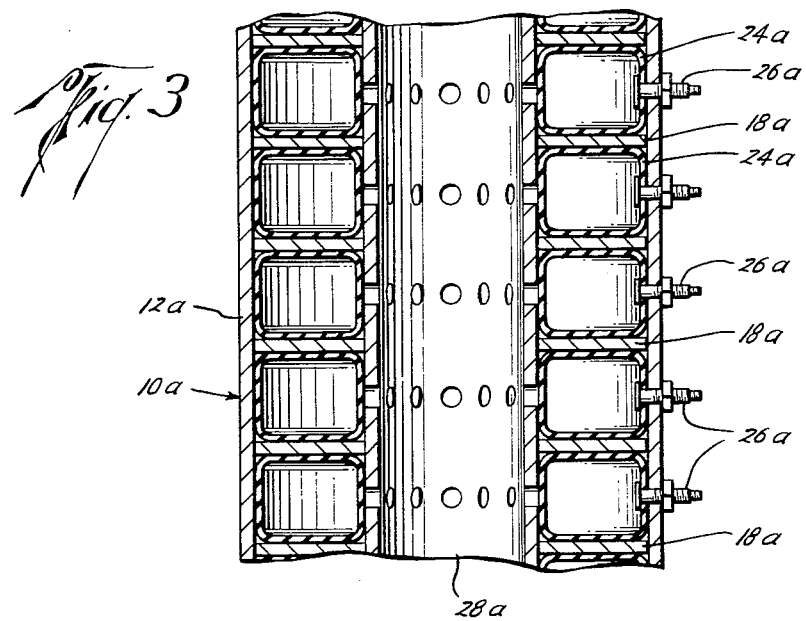
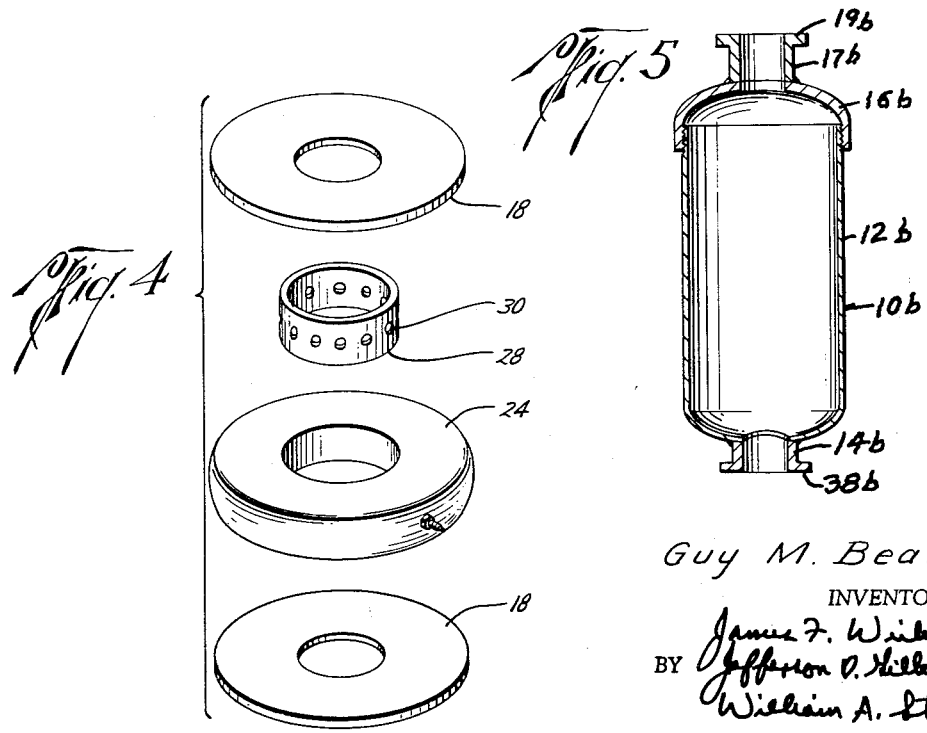
Guy M. Beatty
INVENTOR.
BY
ATTORNEYS

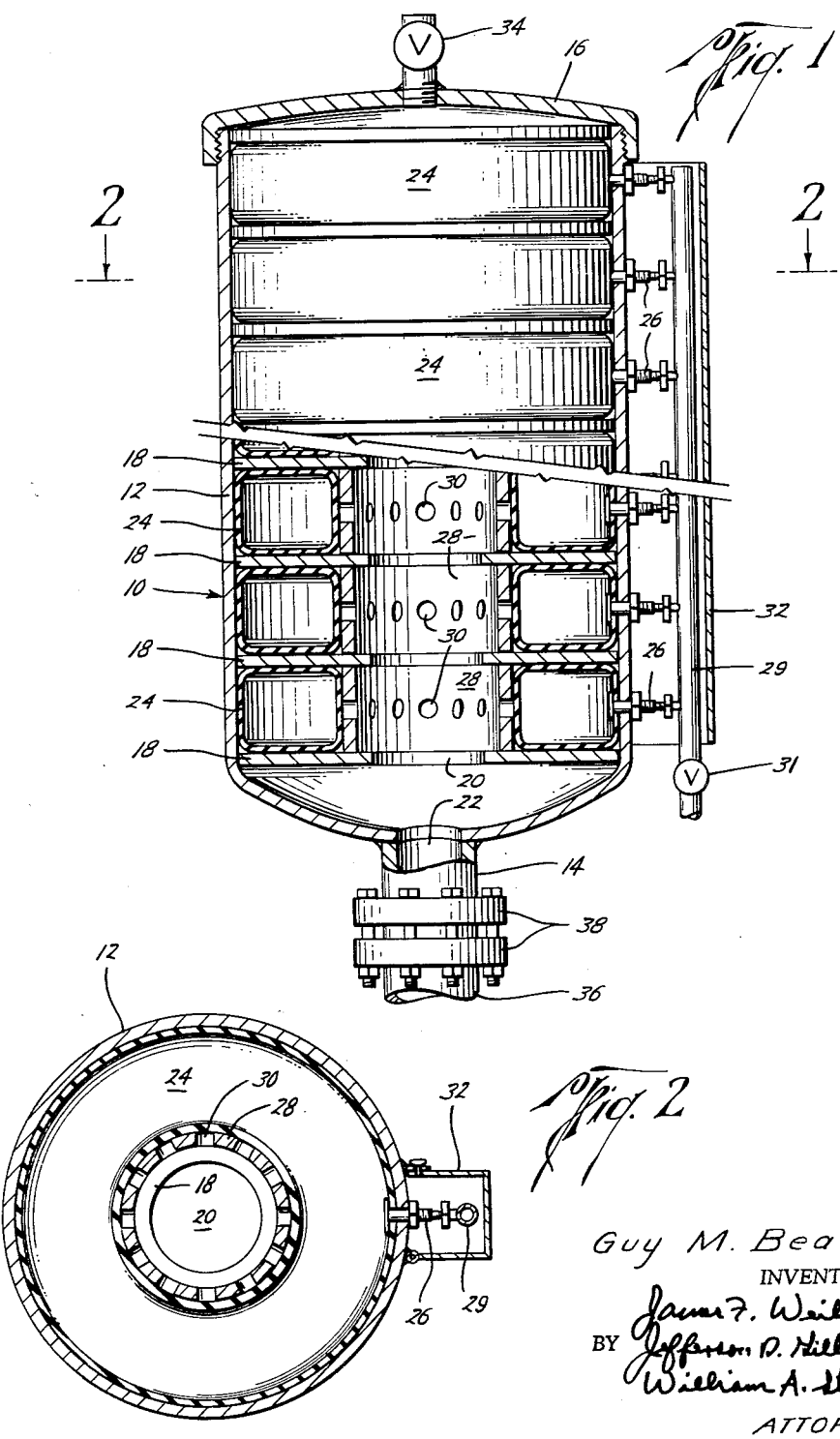

United States Patent Office 3,035,613
Patented May 22, 1962

3,035,613
PULSATION DAMPENER
Guy M. Beatty, Bakersfield, Calif., assignor to Chiksan Company, Brea, Calif., a corporation of California
Filed Aug. 8, 1958, Ser. No. 754,082
1 Claim. (Cl. 138—30)

This invention relates to a pulsation or pressure surge dampener particularly adapted for use in pipe lines in which pressure surges occur causing violent pulsations or movements of the flow line.

In pulsation dampeners now in use, there usually is provided a single diaphragm or a bladder type arrangement to dampen the pressure surges occurring in a line to which the pulsation dampener is connected. These are generally unsatisfactory in that if the diaphragm or bladder fails there is no provision for dampening of subsequently occurring pressure surges. Also, the pulsation dampeners of the type mentioned are not entirely satisfactory for dampening pressure surges of widely different magnitudes as the diaphragm or bladder must be preset for pulsation surges within a narrow magnitude range.

It would be highly advantageous to provide a pulsation dampener in which if there is a failure, the pulsation dampener will still function and also one which effectively and efficiently dampens pulsations or pressure surges of considerably different magnitudes.

Accordingly, an object of the present invention is to provide a pulsation dampener which satisfactorily dampens pulsations or pressure surges although one or more of the dampening elements may have failed.

Another object of the present invention is the provision of a pulsation dampener in which pressure surges or pulsations of greatly varied magnitude are effectively and efficiently dampened.

Another object of the present invention is the provision of an improved pulsation dampener which is readily and easily constructed, maintained and repaired and which is of rugged construction and is efficient in operation.

Another object of the present invention is the provision of such a pulsation dampener which may be connected to a flow line or which, alternatively, may form a part of the flow line so that it effectively dampens pulsations or pressure surges therein.

Other and further objects, features and advantages will be apparent from the following description of three examples of the invention and the accompanying drawings, wherein FIGURE 1 is an axial section, with certain parts in elevation, of the pulsation dampener of the invention, FIGURE 2 is a cross-sectional view taken along the line 2—2 of FIGURE 1, FIGURE 3 is a fragmentary axial section illustrating a modification of the pulsation dampener of the invention, FIGURE 4 is an expanded view of pressure dampening elements of the structure of FIGURE 1, and FIGURE 5 is an axial section of another modified form of the pulsation dampener of the invention, drawn to a reduced scale, and with parts omitted.

Referring to the drawings, and particularly to FIGURE 1, a pulsation dampener generally indicated by the reference numeral 10 is illustrated which includes the generally cylindrical body or housing 12 which has an inlet 14 disposed at one end and which is closed at the other end by a cover 16 which is threadedly or otherwise releasably secured to the upper end of the body 12.

Disposed within the body 12 are a plurality of discs 18 which are each provided with a generally circular opening or passage 20 at their central portions to provide a continuation of the passage 22 in the inlet pipe 14.

Disposed between the discs 18 are a plurality of hollow dampener elements 24 which are generally ring-shaped and which are each provided with a fitting 26 by which pressurized fluid such as air, nitrogen and the like, is introduced into the associated dampener element 24. These dampener elements 24 are formed of a resilient material, such as rubber, flexible plastics or any suitable resilient material which is inert to the fluids flowing in the pulsation dampener 10.

Disposed interiorly of each dampener element 24 is a ring-like member 28 which is provided with the perforations 30 and which spaces apart the adjacent discs 18. Each ring 28 provides support for the inner circumference of the associated dampener element 24 preventing it from closing the passage between the adjacent openings 20 when the element 24 is pressurized.

In the arrangement illustrated in FIGURE 1, the pressure fittings 26 are all connected to a manifold 29 having a valve 31 therein, the pressure fittings 26 and the manifold 29 being disposed within an openable body portion 32. In this arrangement, all of the dampener elements 24 are supplied with fluid at the same pressure.

In the head cover 16 a pressure relief valve 34 is provided to permit escape of greatly excessive pressures occurring in the pressure surges.

The inlet pipe 14 may be connected to any flow line, as desired. It is here shown connected to the flow line 36 by means of the flanges 38 although it may be connected in other ways.

In assembling the pressure dampener of FIGURE 1, a disc 18 is first placed in the body 12, a ring 28 is disposed within the pressure dampening element 24 and both are then placed on top of the disc 18. A second disc 18 is then placed on top of the ring 28 and the pressure dampening element 24 and this is repeated as many times as required to fill the body 12. The cover 16 is then attached and the elements 24 are inflated to the desired respective pressures. Thus, in effect there are provided a plurality of separate dampening elements snugly confined in separate dampening chambers.

The pressure dampener 10 is connected to any flow line and as pressure surges occur, these enter the pulsation dampener and are absorbed by passing through the perforations 30 and spending themselves against the pressurized pressure dampening elements 24.

It is noted, that if any pressure dampening element 24 should fail, the remaining elements would continue to function and would adequately dampen the pressure surges until such time as the non-functioning dampening element is replaced.

If desired, and as illustrated in FIGURE 3, the rings 28 may take the form of a continuous section of pipe 28a and the ring-like pressure dampening elements 24a can individually be pressurized by means of the individual pressure fittings 26a.

Also, while not shown, the section of pipe 28a may form a part of the flow line if desired rather than being connected to the flow line as a branch thereof.

Also, referring to FIGURE 5, the pressure dampener 10b may form a part of the flow line by connecting the flanges 19b and 38b to the flow line so that fluid flows through the pressure dampener 10b. Any of the pressure dampening arrangements previously described can be used in the body 12b.

The present invention, therefore, has the advantages and is adapted to attain the objects and ends mentioned as well as others inherent therein.

While only three examples of the invention have been given for the purpose of disclosure, further changes in details and arrangement of parts can be made which are within the spirit of the invention and the scope of the appended claim.

What is claimed is:

A pulsation dampener adapted to be connected to a pipe line containing fluid subject to pressure surges comprising: a housing having a fluid surge inlet at one end thereof and a longitudinally extending wall portion, a plurality of flat discs in said housing with their peripheral edges in abutment with said wall, a plurality of rigid tubular members having fluid surge communicating perforations extending radially therethrough and spacing said discs apart, each of said discs having an opening therethrough substantially aligned with said inlet, said discs and said rigid tubular members defining a longitudinally extending series of chambers within said housing, a plurality of resilient dampener rings each confined in one of said chambers in coaxial relation with said openings in said discs and each being hollow and having fluid therein, a plurality of pressure fittings each connected through said longitudinally extending wall of said housing to a respective dampener ring and aligned in a manner to be connected to a longitudinally extending manifold member, a pressurized fluid distributing manifold connected to all of said pressure fittings for introducing fluid into the dampener rings, and valve means connected to said manifold for regulating the pressure of the fluid introduced to said dampener rings.

References Cited in the file of this patent

UNITED STATES PATENTS

| | | |
|---|---|---|
| 1,933,347 | Shanklin | Oct. 31, 1933 |
| 2,196,993 | Kidder | Apr. 16, 1940 |
| 2,477,315 | Smith | July 26, 1949 |
| 2,540,676 | Johnson et al. | Feb. 6, 1951 |
| 2,638,932 | Alexander | May 19, 1953 |
| 2,701,583 | Rux | Feb. 8, 1956 |
| 2,771,270 | Selberg et al. | Nov. 20, 1956 |
| 2,815,829 | Boehm et al. | Dec. 10, 1957 |
| 2,841,181 | Hewitt et al. | July 1, 1958 |
| 2,885,226 | Mueller | May 5, 1959 |

FOREIGN PATENTS

| | | |
|---|---|---|
| 730,201 | Germany | Jan. 8, 1943 |
| 947,201 | France | Jan. 10, 1949 |